US00RE37255E

(19) United States
(12) Reissued Patent
Payne et al.

(10) Patent Number: US RE37,255 E
(45) Date of Reissued Patent: Jul. 3, 2001

(54) ADDRESS SETTING MEANS FOR FIRE DETECTORS

(75) Inventors: Roger D. Payne, Hordean; Alan Capaldi-Tallon, Hayling Island, both of (GB)

(73) Assignee: Apollo Fire Detectors Limited, Hampshire (GB)

(21) Appl. No.: 09/272,999

(22) Filed: Mar. 19, 1999

Related U.S. Patent Documents

Reissue of:
(64) Patent No.: 4,988,977
Issued: Jan. 29, 1991
Appl. No.: 07/388,165
Filed: Aug. 1, 1989

(30) Foreign Application Priority Data

Sep. 5, 1988 (EP) ..... 88308190
May 12, 1989 (EP) ..... 89304823

(51) Int. Cl.[7] ..... G08B 25/00
(52) U.S. Cl. ..... 340/524; 340/514; 340/506; 340/534; 340/532; 340/588; 340/589; 340/535
(58) Field of Search ..... 340/524, 514, 340/506, 534, 532, 535, 588, 589

(56) References Cited

U.S. PATENT DOCUMENTS

| | | | |
|---|---|---|---|
| 3,778,796 | 12/1973 | Honda | 340/517 |
| 4,223,830 | 9/1980 | Walton | 235/380 |
| 4,369,435 | 1/1983 | Adachi et al. | 340/506 |
| 4,489,312 | 12/1984 | Yoshizaki | 340/514 |
| 4,658,243 | 4/1987 | Kimura et al. | 340/505 |

FOREIGN PATENT DOCUMENTS

| | | |
|---|---|---|
| 2235920 | 3/1974 | (DE) . |
| 7823178 | 9/1979 | (DE) . |
| 2916412 | 11/1980 | (DE) . |
| 3428702 | 2/1986 | (DE) . |
| 0158817 | 10/1985 | (EP) . |
| 2170629 | 8/1986 | (GB) . |
| 58-129594 | 9/1983 | (JP) . |
| 59-108189 | 6/1984 | (JP) . |
| 61-220093 | 9/1986 | (JP) . |
| 62-14145 | 3/1987 | (JP) . |

OTHER PUBLICATIONS

IBM Technical Disclosure Bulletin, vol. 26, No. 7, Dec. 1983, p. 3156.*
Interlocutory Decision in Opposition Proceedings Under Article 106(3) EPC, dated Jan. 30, 1998.*
Communication pursuant to Rule 58(5) EPC that Interlocutory Decision is Final, dated May 15, 1998.*

* cited by examiner

*Primary Examiner*—Donnie L. Crosland
(74) *Attorney, Agent, or Firm*—R. Lewis Gable; Cowan Liebowitz & Latman PC

(57) ABSTRACT

A fire detector assembly comprises a base (1) and a sensor (5) adapted to fit the base. The base (1) is provided with passive means, such as pins (6) or contacts arranged in a pattern to represent an address of the detector. When the sensor (5) is fitted to the base (1), reading means in the sensor reads the address code and thereby conditions the sensor to receive appropriate signals from a control unit.

17 Claims, 4 Drawing Sheets

ADDRESS SETTING MEANS FOR FIRE DETECTORS

Figure 1:
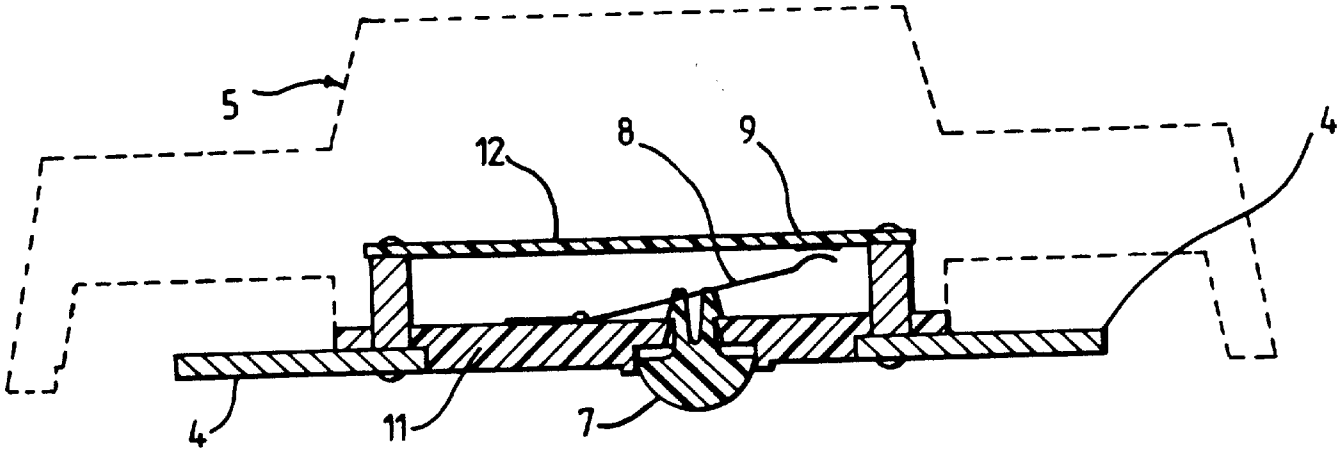
Figure 1A:
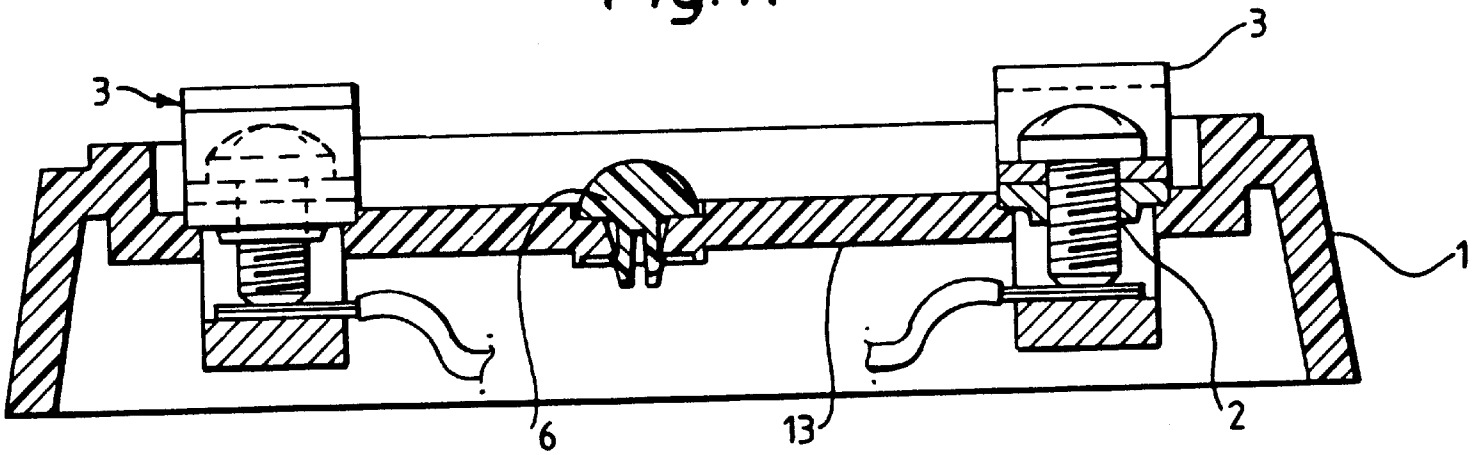

Matter enclosed in heavy brackets [ ] appears in the original patent but forms no part of this reissue specification; matter printed in italics indicates the additions made by reissue.

This invention relates to means for improving the reliability and/or reducing the cost of fire detection systems in which fire detectors are allocated a unique address code corresponding to known locations so that a control unit may selectively communicate with individual detectors at known locations.

In known fire alarm systems there are three methods in common use of setting the address of a detector.

One method is to set the address code in the detector's mounting base. The address may be set actively by altering the position of one or more switches connected to active electronic circuitry in the base, or by uniquely programming an electronic memory connected to such circuitry in the base. This method has the advantage that the address code is not disturbed if the sensor part of the detector which attaches to the base is replaced by another sensor of the same type or of a different type. The control unit will therefore correctly correlate the address code with the location of the detector. A disadvantage of this method is that the electronic circuitry contained in the mounting base may be damaged when high voltages are applied to system wiring for the purpose of checking insulation resistance. A further disadvantage is that in the event of a fault developing in the electronic circuitry contained within a mounting base mounted on a high ceiling, the fault may not be easily rectified without the aid of ladders or scaffolding whereas the sensor may be easily removed with devices generally known as 'extractor poles'. Special extractor poles can be made for removing electronic assemblies from a base but such assemblies complicate the design of the base, introduce additional mechanical and electrical connections and so reduce reliability and increase costs.

A second method is to set the address in the active sensor part of the detector. This method has the advantage that the active circuitry, i.e. sensor electronics and the communications electronics including the address electronics may be incorporated into one electronics thereby reducing the cost and increasing the reliability of the detector. The mounting base need not contain any electronic components other than wiring terminations and contact means for connecting to the sensor. The base may therefore be subjected to high voltages when the sensor is removed, and, because it contains no electronics the need for access to the base for repairs or maintenance purposes is virtually eliminated. The disadvantage of such a system is that when a sensor is removed from its base for cleaning or maintenance it may in error be replaced by a sensor from another location having a different address to that set in the detector that was removed. In this event the control unit will attribute data from the replaced detector to an erroneous location which may be detrimental to the performance of the system.

A third method is to set addresses sequentially and automatically during system initialisation. With this method the control unit sends an address code to the first detector on the detector wiring circuit. The detector receiving the address stores the address code in its active electronic circuitry and then activates a switch to connect a second detector into the detector wiring circuit. The control unit then sends another address to the second detector and the process is repeated until all detectors have been coded with an address. This technique has the disadvantage that detectors must be wired sequentially or fitted with further electronic means to identify spur wired detectors. Furthermore each detector must contain an electronically controlled switching means which increases cost and may reduce the reliability of the system because the operation of detectors beyond the first detector is dependent on the correct functioning of the first detector.

This invention provides an alternative solution in that the address code is set in the base by passive means only, the sensor having means for reading the address code when it is fitted to the base. After reading the address code, the latter means conditions the sensor to receive signals identified by the address code.

In [a preferred embodiment of] the invention, the address code is set in the mounting base by mechanical means alone and the sensor has means for sensing the position of, or presence or absence of, the mechanical coding means whereby when the sensor is inserted into the base, it is able to read the settings of the mechanical address means and convert them into an equivalent electrical code. Thus the address in the base is transferred to the sensor when the sensor is inserted into the base. In such an arrangement the need for electronic components in the base for address purposes is avoided and detectors can be interchanged without the risk of inadvertently changing the address of the location in which the detector is installed. Thus the invention can be embodied to provide the cost advantages of having all the electronics in the sensor part of the detector with the reliability associated with having the address code set in the detector base.

Figure 2A:
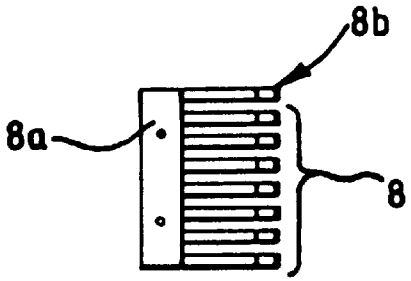
Figure 2:
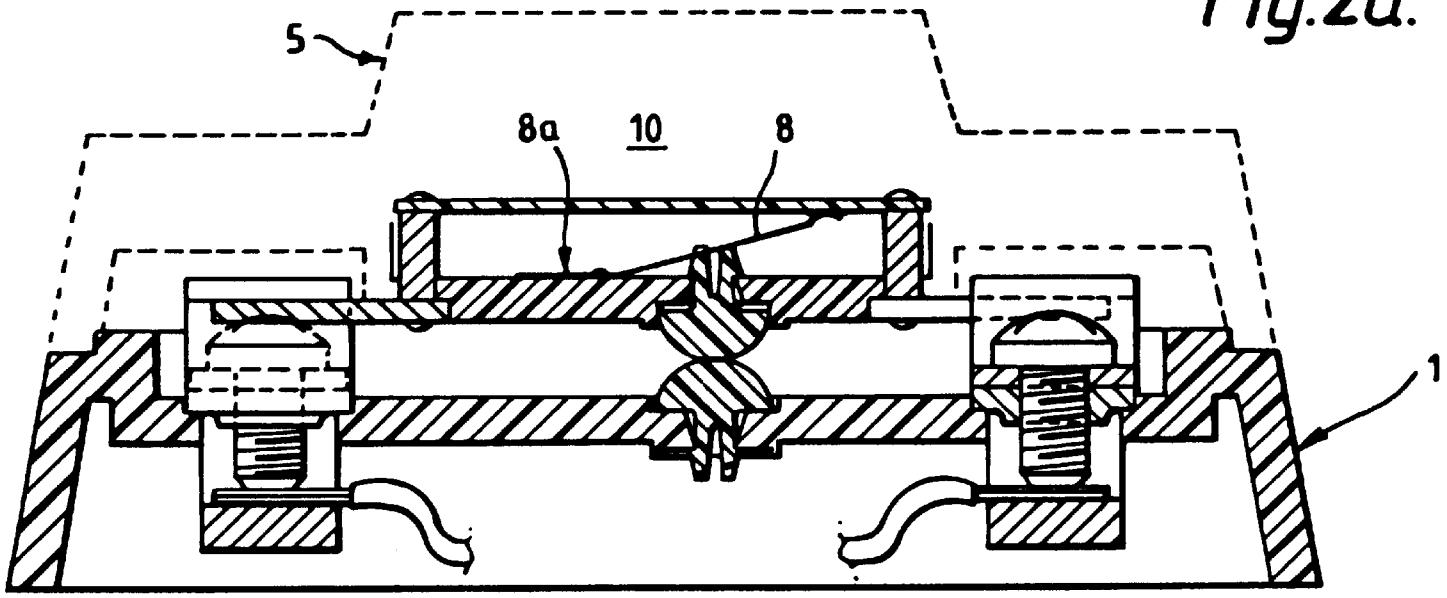

In the accompanying schematic drawings:

FIGS. 1 and 2 illustrate an embodiment of the invention in respectively different stages of disassembly and assembly, and FIG. 2A illustrates a preferred comb arrangement, and FIGS. 3–10 illustrate a modification of the embodiment shown in FIGS. 1 and 2.

As shown in FIGS. 1 and 2, a mounting base (1) is fitted with two or more terminals (2) for terminating wiring connecting the base ( 1) with a control unit (not shown) and the base of other detectors (not shown). Terminals (2) are connected to contacts (3) which connect with contacts (4) of the sensor (5) when a sensor (5) is engaged with the base (1) thus providing means for supplying power and data from the control unit to the sensor (5). The base (1) is further fitted with a plurality of address coding pins (6), the presence or absence of which defines an address code. By way of example only, an embodiment having provisions for 7 pins may be binary coded to give 128 address codes. The scope of the invention is not limited to the presence or absence of coding pins but extends to coding by position of a constant or variable number of pins and to codes other than the binary code. The sensor (5) is fitted with movable address code reading pins (7) which align with the address coding pins (6) in the base (1) when the sensor (5) is engaged with the base (1). The offset between pins (6) and (7) seen in FIG. 1 is due to the fact that the sensor (5) needs to be rotated through a small arc, after it has been fitted to the base, so that contacts (4) engage with contacts (3). The pins (6) and (7) are then aligned as shown in FIG. 2.

The movable address code reading pins (7) are individually biased to a first position by electrically conducting leaf springs (8). One end of each electrically conducting leaf spring is common to one end of all other electrically conducting leaf springs in mechanical contact with all other movable address coding pins. Furthermore the common end of the electrically conducting leaf spring arrangement is further connected to a source of electrical supply, preferably by an additional electrically conducting leaf spring (8b) not in mechanical contact with an address code reading pin. The inset FIG. 2a illustrates a preferred comb arrangement where the leaf springs 8 extend from a common member 8a, the comb being of a one-piece structure made of conductive material. The source of supply may conveniently be a conducting pad on a printed circuit board (10).

As shown in FIG. 1, when the sensor (5) is not engaged with the base (1), the electrically conducting leaf springs (8) are biased to a first position by their own spring action so that the address code reading pins (7) are biased to a first position away from an insulating support (11). In this state, the free end of each electrically conducting leaf spring (8) is spaced apart from a respective conducting pad (9) on a printed circuit board (12 ) which carries the circuitry for interpreting the pattern of electrical contacts that constitute the address. As such circuitry may be of conventional construction, no further description is required. However, when the sensor (5) is engaged with the base (1), only those address coding pins (6) which are present in the base (1) depress the address code reading pins (7) to a second position where they cause the free ends of the electrically conducting leaf springs (8) to make contact with the respective conducting pads (9) on the printed circuit board (12). The presence or absence of an address coding pin (6) at each location for a pin in the base determines whether or not an electrical contact is made in the sensor. The mechanically set address code is therefore translated from the base to the sensor by mechanical means and thence to an electrically coded address by electro-mechanical means.

Since the address coding pins (6) merely serve to deflect the leaf springs (8), they may be made of any suitable material e.g. such as plastics. Suitably, a plurality of these pins (6) are provided in loose form so that the user can select a sufficient quantity and fit them to the base (1) in the required address code pattern. As shown in the drawings, pins (6) and (7) are of identical construction to simplifyre manufacture and they are designed to be a snap fit into respective apertures in member (11) of the sensor and in a web portion (13) of the base (1).

An advantage of using passive *mechanical* means, such as pins (6) to form the address code is that the address can be simply and permanently stored by non-electronic means. Such address means is more robust than electronic means and it can be easily read during operation of the fire detector whereby no electronic memory is required, nor circuitry for reading the address into memory, since the passive address can be constantly referred to as the memory. However, there may be applications where the sensor includes a memory and also appropriate circuitry for storing an address. [One such application may employ mechanical means defining a bar code in the base (9) and optical scanning means in the sensor (5) for reading the bar code. This, of course, would be more expensive than the former arrangement and it would be necessary to ensure that addresses were correctly read into memory.]

Various passive *mechanical* means may be utilised to provide the address code in the base. For example, besides the arrangements described above, the base may have electrical contacts for making electrical connections with reading means in the sensor. [This arrangement would have a similar advantage to that obtained with the use of purely mechanical addressing means. Alternatively, devices such as reed switches and operating magnets may be employed although these would be more expensive and would require means to ensure no overlap of magnetic fields.]

The term passive *mechanical* means is therefore intended to cover different kinds of devices which enable an address code to be stored in a passive *mechanical* way so that the address can be read only after the sensor has been fitted to the base.

Figure 5:
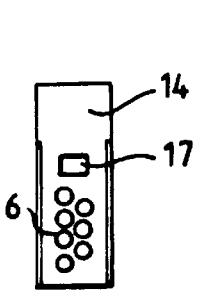
Figure 4A:
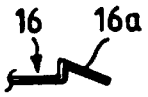
Figure 4:
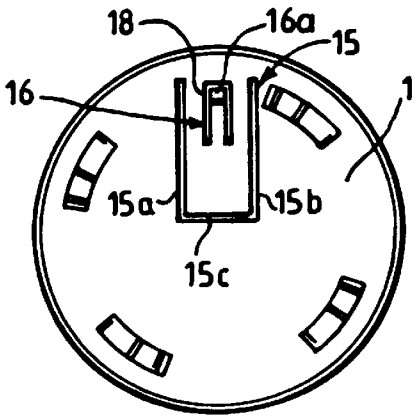

FIGS. 3–10 illustrate a modification wherein the coding pins (6) for the base (1) are provided on a removable "card" (14). The term "card" is used generally since it may be of various shapes and/or materials, although it is usually a plastic card with integral pins (6). One or more of the pins (6) are removed by the installer prior to inserting card (14) into a "card slot" (15) in the detector base. Slot (15) comprises guides (15a, 15b and 15c) for guiding the sides of card (14), which may be chamfered (as shown in FIG. 5), into the correct position on the base (1) until the end of the card abuts the guide (15c). As the card (14) is inserted, a catch (16) is initially biased away from the card by the leading edge of the card applying pressure to a ramp (16a) formed on one side of the catch and shown in the inset FIG. 4a. Upon further insertion the catch engages with a hole or recess (17) (or protrusion) in or on the card when the end of the card abuts the guide 15(c). As shown in FIG. 4, the catch (16) is part of a cut-out (18) in the base (1) that defines an arm which acts like a leaf spring. When the card is fully inserted, it cannot be removed without manually deflecting the catch, the catch not having a second ramp in the reverse direction. It is impossible to remove the card from the base with the sensor (5) fitted because the sensor (5) then overlies and thereby prevents access to the catch (16). The detector may be secured to the base using locking means known to those in the art to prevent unauthorised removal of the sensor and the address card. Unauthorised removal of the address card can be detected, when the sensor is removed because its code reading pins (17) are then no longer aligned with the address coding pins (6) in the base (1) and this could be detected by a central control to which the detector assembly is fitted and an alarm, pertaining to the absence of the sensor, could thereby be given.

Preferably a part of the address card is exposed when inserted into the base and the exposed part marked with a number or code corresponding to address code carried by the coding pins.

Figure 9:
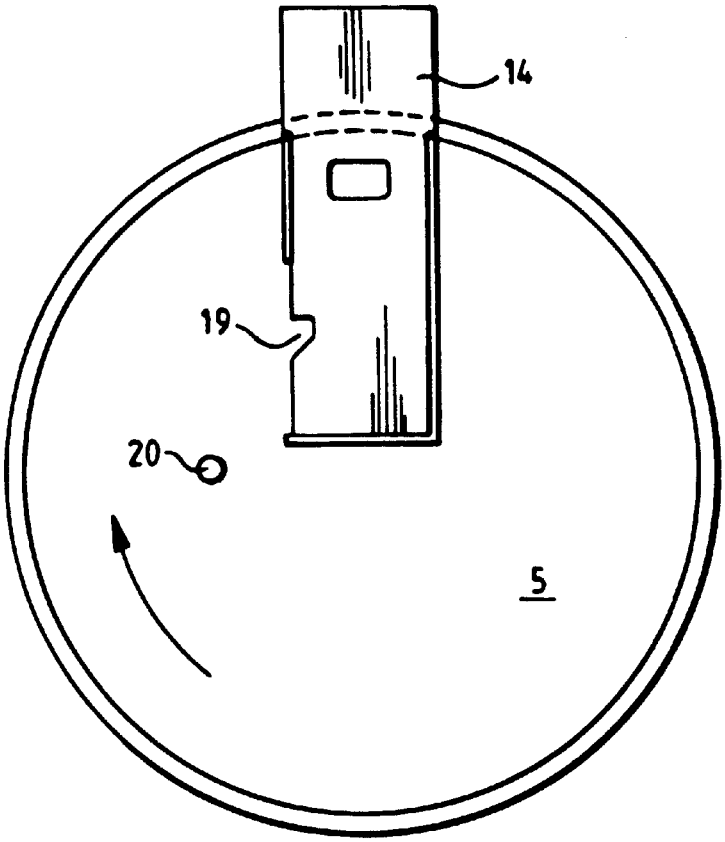
Figure 10:
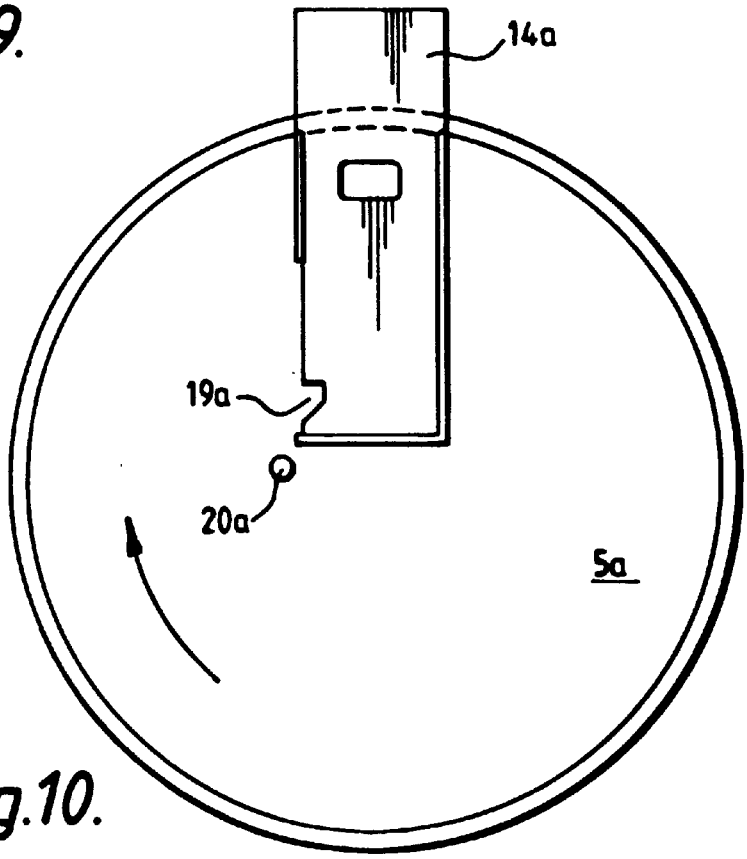

Preferably, the address card (14) is further coded, e.g., by recesses or holes (19) so that it can only be used with a designated type of detector, for example, either a smoke, or a heat detector. As shown in FIG. 9, the recess (19) engages with a polarising pin or key (20) on the sensor (5) as the sensor is rotated through the small arc when it is fitted to the base. FIG. 10 shows a similar construction but where the recess 19a is in a different radial position on the card 14a to engage a corresponding pin 20a. If an attempt is made to fit a TYPE A sensor (FIG. 9) to a base fitted with a TYPE B address card (FIG. 10), or a TYPE B sensor (FIG. 10) to a base fitted with a TYPE A address card (FIG. 9), the pin (19 or 19a) would abut the edge of the card (14 or 14a) thereby preventing the wrong sensor (5) from being rotated fully into its "card reading" position. In the event of such a misfit, the address will not be sensed and this will cause an alarm to be given in the central control.

Figure 8:
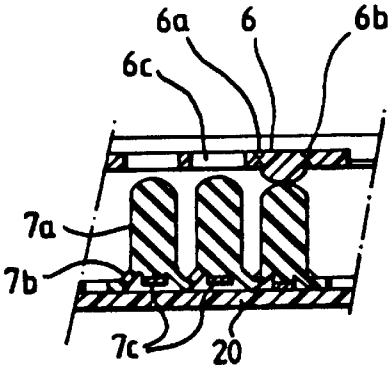
Figure 7:
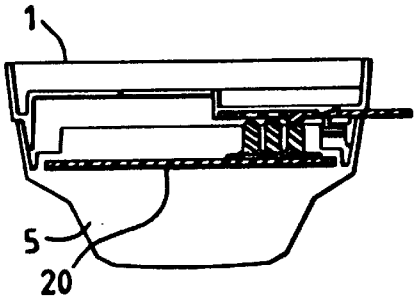

As shown in FIG. 8, the address coding pins (6) may be in the form of knock-out or press-out "poles", e.g., buttons which are easy to remove as a result of peripheral portions of reduced cross-section (6a and 6b) made in the address card moulding.

Figure 3:
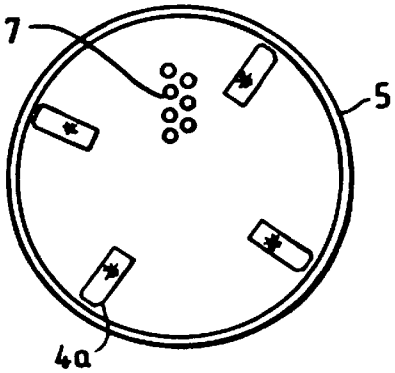
Figure 6:
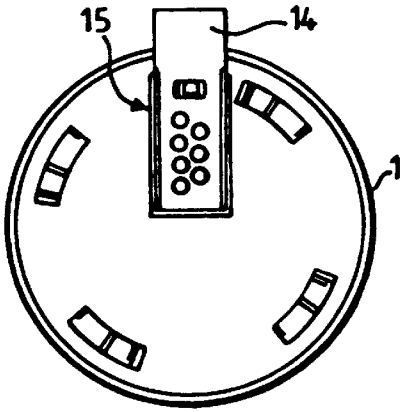

Preferably, the address code reading pins (7) are in the form of a membrane key pad, i.e. similar to the type of construction used in hand-held calculators. However, instead of being used as a single input key pad, the key pad provides a parallel address coding pin input which is sensed in order to designate a particular fire detector. The membrane key pad may be a plastics moulding with a series of integral buttons (7a) supported by membranes (7b). Each button has a conductive contact (7c) positioned over adjacent conductive tracks (not shown) formed on a printed circuit board (20) which is part of the sensor (5). When sensor (5) is fitted to base (1), the button (7a) is depressed by the presence of a pin (6) whereby its contact (7c) bridges the conductive tracks to cause an appropriate signal. If a pin (6) is removed from the address card, then a hole FIG. 3 is positioned over the pin (7) so that its contact (7c) remains clear of the conductive tracks. FIG. 3 is a plan view of the sensor (5) showing the location of the membrane key pad (7) and also the location of contact wiper (4a) which makes electrical contact with contact (3a) on the base (1) when the sensor is fitted to the base.

A central control including circuitry for interrogating each detector, i.e. with respect to its address and its status, is well known to those skilled in the art and therefore requires no further description.

We claim:

1. An addressable fire detector assembly for receiving address coded signals from a central control, said assembly comprising a base and a sensor, said base and said sensor having means which enable them to be fitted together to form said assembly, said base having passive means to define an address code, *the passive means being formed only by mechanical means for storing the address code,* said sensor having means for reading said address code [and for conditioning said sensor to receive said address coded signals from said central control] *whereby the address code is read when the sensor is fitted to the base and the sensor is thereby conditioned to receive signals from the central control.*

2. An assembly according to claim 1 wherein said passive means comprises a plurality of elements in a particular arrangement in a given region, the reading means in the sensor being capable of detecting the presence or absence of said elements in said region.

[3. An assembly according to claim 2 wherein said elements are mechanical elements.]

4. An assembly according to claim [3] *1* wherein the reading means includes switching elements which are operated by the mechanical elements where present.

5. An assembly according to claim 4 wherein the switching elements include a plurality of leaf springs mounted on a common conductive member, the sensor including a printed circuit having contact pads thereon which are engaged by the leaf springs that are operated by the mechanical elements where present.

6. An assembly according to claim 1 wherein the passive means comprise electrical contacts on said base, the reading means being provided with electrical contacts for making respective electrical connections with the contacts on the base and including circuitry which is responsive to said electrical connections in order to read the address code.

7. An assembly according to claim 1 wherein the passive means is arranged to represent a binary address code.

8. An addressible fire detector assembly according to claim 1 wherein the passive means are attached to a card-shaped member which is received in guides on the base, the card-shaped member having either a recess or key for cooperating with a respective key or recess on the sensor when the sensor is of a designated type to be fitted to the base, the arrangement also being such that a catch secures the member to the base when the member is fitted to the base and that the sensor makes the catch inaccessible when the sensor is fitted to the base.

9. An assembly according to claim 1 wherein the sensor includes a memory for storing the address code read from the passive means.

10. An addressible fire detector assembly according to claim 1 wherein the passive means are removably fitted to the base either individually or collectively.

11. An addressible fire detector assembly according to claim 10 wherein the passive means are part of a member which is secured against removal from the base when the member has been fitted to the base.

12. An addressible fire detector assembly according to claim 1 wherein the base is provided with means which cooperate with the sensor to enable only a sensor of a designated type to be fitted to the base.

13. An addressible fire detector assembly according to claim 12 wherein a part of said means is on a member to which the passive means are attached, said member being removably fitted to the base.

14. An addressible fire detector assembly for receiving address coded signals from a central control, said assembly comprising a base and a sensor having means which enable them to be fitted together to form said assembly, said base also having mechanical means for defining a bar code, said sensor having means for reading said bar code and for conditioning said sensor to receive said address coded signals.

15. An addressible fire detector assembly for receiving address coded signals from a central control, said assembly comprising a base and a sensor, said base and said sensor having means which enable them to be fitted together to form said assembly, said base also having a plurality of address coding pins, said pins being spatially disposed for physically defining an address code to identify said assembly, said sensor having a plurality of switchable elements, which are spatially disposed for actuation by said address coding pins when said sensor is fitted to said base, said sensor further including circuitry responsive to said switching elements for reading and storing said address code whereby said assembly is conditioned to respond only to said address code signals containing said address code defined by said pins.

16. An addressible fire detector assembly according to claim 15 wherein said address coding pins are provided on a card, said card being removably fitted to said base, said base further including means for locating said card in a predetermined reading position at which said address code can be read.

17. An addressible fire detector assembly according to claim 16 wherein said card is provided with a predetermined edge profile and wherein said sensor is provided with abutment means to engage the predetermined edge profile of said card when said sensor is fitted to said base, said edge profile and said abutment means being disposed so as to enable only a sensor of a predetermined type to be fitted to said base in which said card is located in said reading position.

*18. An addressable fire detector assembly for receiving address coded signals from a central control, said assembly comprising a base and a sensor, said base and said sensor having engaging surfaces configured to enable said base and said sensor to be fitted together to form said assembly, said base having a plurality of passive mechanical coding pins defining an address code, each of said plurality of mechanical coding pins having an engaging surface, the*

*address code being stored only by said passive mechanical coding pins, said sensor having a plurality of mechanical reading pins, each responding to said engaging surface of a corresponding one of said plurality of mechanical coding pins to read said address code whereby the address code is read when the sensor is fitted to said base and sensor is thereby conditioned to receive signals from the central control.*

* * * * *